United States Patent [19]

Brassington

[11] Patent Number: 5,492,084
[45] Date of Patent: Feb. 20, 1996

[54] RESTRAINING DEVICES

[76] Inventor: Rex H. Brassington, 37 Morris Avenue, Newbold, Chesterfield, Derbyshire, S41 7BA, United Kingdom

[21] Appl. No.: 221,858

[22] Filed: Apr. 1, 1994

[30]   Foreign Application Priority Data

Apr. 6, 1993 [GB] United Kingdom .................. 9307174
Sep. 14, 1993 [GB] United Kingdom .................. 9318956

[51] Int. Cl.$^6$ ................................................ A01K 27/00
[52] U.S. Cl. ............................................................ 119/771
[58] Field of Search ................................. 119/771, 784, 119/792, 856; 297/473

[56]               References Cited

U.S. PATENT DOCUMENTS 2,909,154  10/1959  Thomas .
3,395,675   8/1968  Fowlkes ................................. 119/784
4,827,876   5/1989  Krekelberg ............................. 119/771

FOREIGN PATENT DOCUMENTS 4033498   4/1992  Germany .
1126525   9/1968  United Kingdom .................. 297/473
WO88/00540  1/1988  WIPO .

*Primary Examiner*—Robert P. Swiatek
*Attorney, Agent, or Firm*—Smith-Hill and Bedell

[57]                   ABSTRACT

A restraining device for an animal comprises safety belt receiving ring adapted to receive a safety belt in a vehicle. The device also comprises a latching hook to secure the device to the animal, and a sleeve fitted on the safety belt receiving ring to prevent movement of the latching hook around the safety belt receiving ring. A harness is also provided which comprises first and second webbings. At least one off the first and second webbings is adapted to pass in front of the front legs of an animal on its underside, and at least one of the first and second webbings is adapted to pass behind the front legs of the animal on its underside. The harness also includes a securing portion to secure the harness to a suitable restraining device.

24 Claims, 3 Drawing Sheets 5,492,084

RESTRAINING DEVICES

BACKGROUND OF THE INVENTION

This invention relates to restraining devices for use in vehicles. More particularly, but not exclusively, this invention relates to restraining devices for animals such as dogs.

If it is desired to transport animals, for example dogs in cars, it is often necessary to provide a suitable cage in which the dog can be placed during the journey. This can cause distress to the animal. Alternatively, if the dog is allowed to remain free within the car a hazard to safety could arise in the event that the dog should distract the driver.

It is an object of this invention to obviate and/or mitigate these disadvantages.

SUMMARY OF THE INVENTION

According to one aspect of the invention, there is provided a restraining device for an animal, said restraining device comprising a safety belt receiving means adapted to receive a safety belt in a vehicle, a securing means to secure the device to the animal, and attaching means to attach the safety belt receiving means to the securing means.

Preferably, the safety belt receiving means is in the form of a ring adapted to receive said safety belt in a space defined thereby. The ring may be substantially triangular in configuration and said attaching means may be provided at an apex of the triangle.

Preferably, the ring has suitable means for allowing the safety belt to be received in the space defined by the ring.

In the first embodiment, the safety belt receiving means is in the form of a split ring having first and second end portions, whereby the safety belt can be passed between said first and second end portions to be received in the space defined by the ring.

The first and second end portions may overlap each other and may be substantially linear. The shape of the ring may be substantially triangular. Both of said end portions may extend substantially across the length of one side of the triangle. Preferably, said attaching means is arranged on the ring opposite said first and second end portions.

In a second embodiment, the safety belt receiving means is in the form of a substantially continuous ring, whereby the safety bell can be passed through the space defined by the ring so that the safety bell can be received therein. In this embodiment, a portion of the ring opposite said attaching means may be substantially linear.

In a third embodiment, the safely belt receiving means is in the form of a ring provided with a hinged portion movable between closed and open positions, whereby when the hinged portion is in the open position, the safety belt can be received into the ring. Preferably, the ring has a substantially linear portion arranged opposite the attachment means. The attaching means may be provided on an apex adjacent said hinged portion.

The attaching means may comprise a sleeve mounted on the ring, the sleeve being adapted to hold the securing means thereon. Preferably, the attaching means is adapted to secure the securing means to the safely belt receiving means such that the securing means is prevented from moving along the safety bell receiving means. Preferably, the sleeve is formed of an elastomeric malarial. The sleeve may be adapted to hold a part of the securing means between the sleeve and the safety bell receiving means. Preferably, the sleeve has a cut out portion to allow said part of the securing means to be received between the sleeve and the safely belt receiving means.

The securing means may be provided with a looped portion adapted to be received between said sleeve and said ring.

In a first embodiment, the securing means is pivotally connected to said looped portion. In a second embodiment, the attaching means comprises an aperture in the safety belt receiving means through which a projection on the securing means can be passed to attach the securing means pivotally to the safety belt receiving means.

The securing means may be adapted to cooperate with a cooperating member attached to the animal. Preferably, the securing means includes a hook shaped member adapted to receive said cooperating member attached to the animal. Preferably, the hook shaped member is provided with resiliently urged opening means movable between open and closed positions, the opening means being urged towards the closed position.

This invention is particularly suitable for use with vertebrate animals, having front legs and being capable of being carried on a seat of a vehicle, more particularly mammals having such characteristics and, in particular, cats and dogs.

According to another aspect of this invention, there is provided a harness for an animal, the harness comprising first and second webbings at least one of said first and second webbings being adapted to pass in front of the front legs of the animal on its underside, and at least one of the first and second webbings being adapted to pass behind the front legs of the animal on its underside, and a securing portion to secure the harness to a suitable restraining device.

In one embodiment, the first webbing may be adapted to pass in front of a first of the animal's front legs and behind the second of the animal's front legs, and the second webbing may be adapted to pass in front of the animal's second front leg and behind the animal's first front leg.

In a second embodiment, the first webbing is adapted to pass in front of both front legs and the second webbing is adapted to pass behind both front legs and the harness further includes a third webbing extending between the first and second webbings to connect the first and second webbings together.

Preferably, the restraining device is as defined in paragraphs 4 to 14 above. Preferably, the first and second webbings are also connected together at opposite ends. Preferably, a ring is provided at opposite ends of the said first and second webbings to connect the webbings together. Further webbings may be connected to said rings, and said further webbings may be connected to further rings for attachment to said restraining device.

BRIEF DESCRIPTION OF THE DRAWINGS

An embodiment of the invention will now be described by way of example only with reference to the accompanying drawings in which.

DETAILED DESCRIPTION

Figure 1:
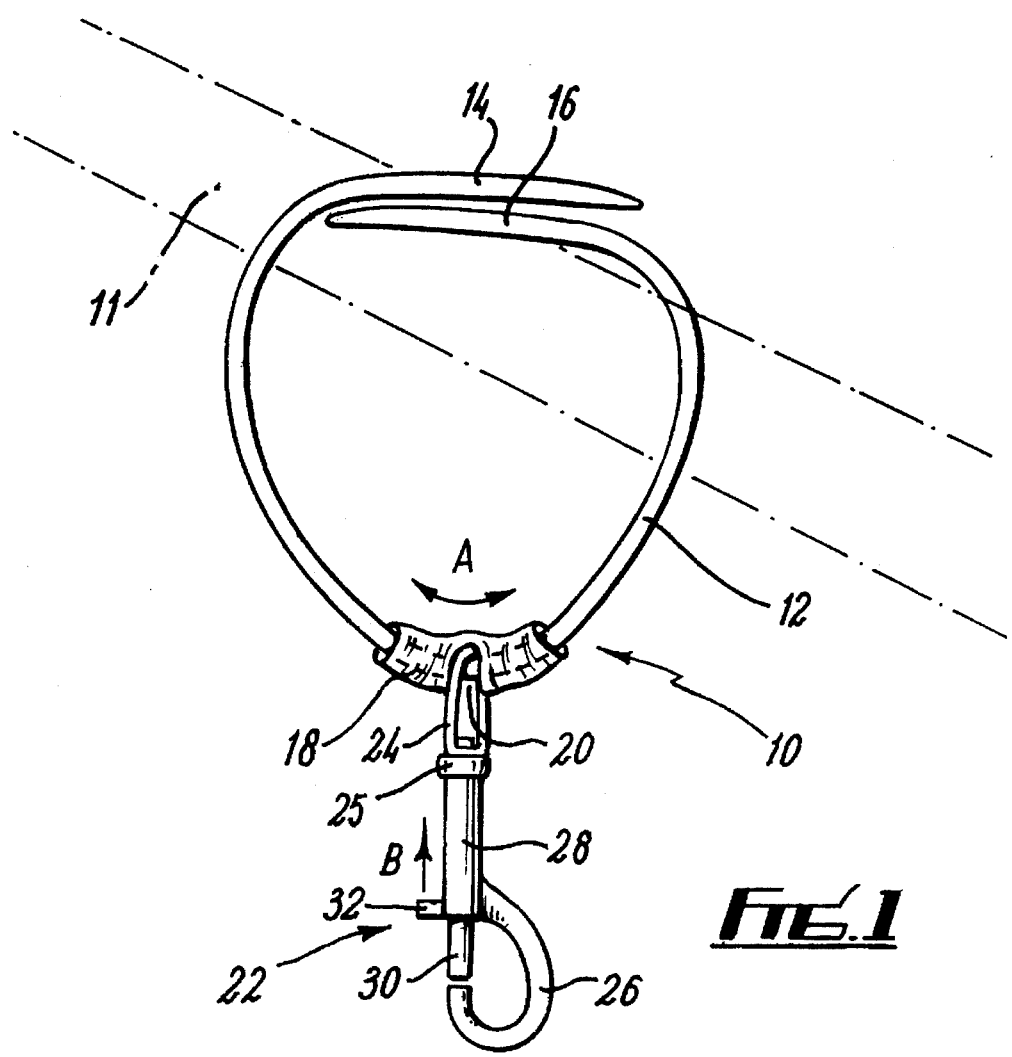
FIG. 1 is a view of a restraining device for an animal.

Referring to FIG. 1, there is shown a device 10 for restraining an animal, such as a dog, in a vehicle. The device 10 comprises a ring 12 adapted to receive a seat belt 11 (shown in dotted lines in FIG. 1) of the vehicle therein. The ring 12 is in the form of a split ring and has overlapping end portions 14,16. The end portions 14,16 are substantially linear, and the ring is substantially triangular in configuration.

Attaching means in the form of an elastomeric sleeve 18 is mounted on the ring at an apex of the triangle opposite the end portions 14,16. The sleeve 18 comprises a cut out portion 20 adapted to hold securing means 22 to the ring 12, as will be explained below. The sleeve 18 is so adapted to prevent lateral movement in the direction indicated by the double headed arrow A of the attaching means.

A device 10 also comprises securing means 22 which is secured to the ring 12 by a loop portion 24 extending through the sleeve 18. The loop portion 24 extends between the sleeve 18 and the ring 12 through the cut out portion 20, as shown in FIG. 1.

The securing means 22 is pivotally mounted on the looped portion 24 at pivot 25.

The securing means 22 includes a hook shaped member 26 and a substantially cylindrical portion 28 which is attached at one end to the pivot 25 and at the other end to the hook shaped member 26. The hook shaped member 26 is adapted for receiving a ring which is attached to the animal to be restrained. An opening member 30 extends from the end of the cylindrical portion 28 to engage the end of the locking portion 30. The opening member 30 extends inwardly of the cylindrical portion 28 and is provided with a handle 32 whereby, upon moving the handle 32 in the direction indicated by arrow B the opening member can be opened. A spring (not shown) urges the opening member 30 towards its closed position.

Figure 2:
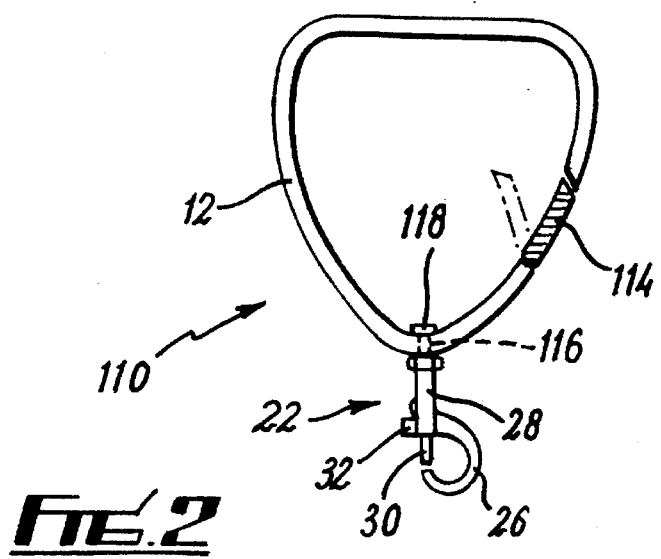
FIG. 2 is a view of an alternative restraining device.

FIG. 2 shows a device 110 which possesses many of the features of the device 10 shown in FIG. 1 and these have been given the same reference numeral. The device 110 shown in FIG. 2 differs from the device 10 shown in FIG. 1 in that it does not possess overlapping end portions 14,16, but possesses a locking member 114 movable between a closed position as shown in FIG. 2, and an open position as shown in phantom in FIG. 2. The device 110 can be secured to a seat belt by passing a seat belt through the gap left by the locking portion 114 when the locking portion 114 is in its open position. When the seat belt has been received in the space defined by the ring 12, the locking member 114 can be moved to its closed position.

Also shown in FIG. 2 is an alternative attachment of the securing means 22 to the ring 12. In this embodiment, the securing means 22 does not possess the looped portion 24 but is connected directly to the ring 12 by virtue of an aperture 116 (shown in dotted lines in FIG. 2) through which a portion of the securing means passes and is secured to the ring 12 by means of a cap 118. Thus, the securing means 22 can pivot in the aperture 116 but other than that, cannot move relative to the ring 12.

It will be appreciated that the embodiment shown in FIG. 1 could incorporate either one of the modifications shown in FIG. 2, if desired.

Figure 3:
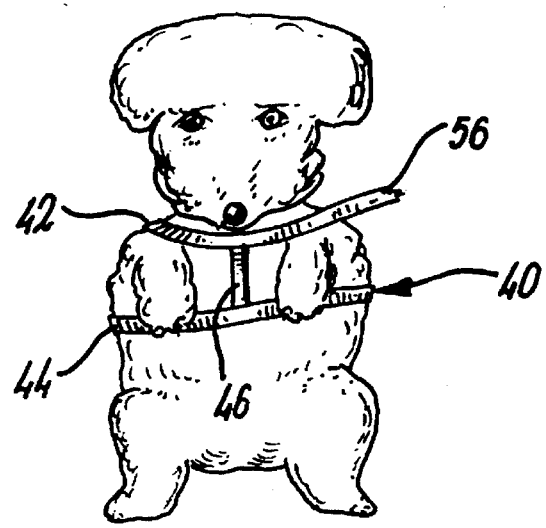
FIG. 3 is a schematic view of a dog wearing a harness.
Figure 4:
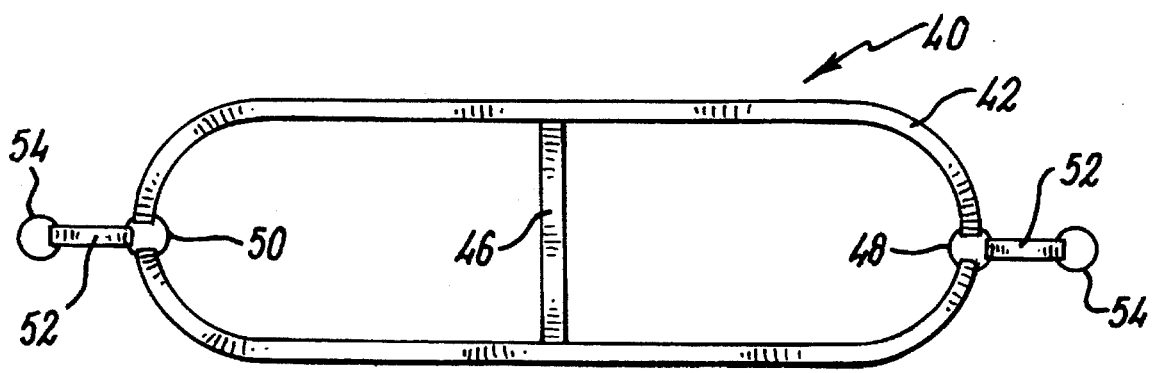
FIG. 4 is a view of the harness shown in FIG. 1.

Referring to FIG. 3, there is shown a dog to which a harness 40 has been fitted. The harness 40 comprises a first webbing 42 extending across the underside of the dog in front of its front legs, and a second webbing 44 extending across the underside of the dog behind its front legs. A third webbing 46 extends between the first and second webbings 42,44. Referring to FIG. 4, there is shown the harness 40 in unfolded condition in which the first and second webbings 42,44 are connected to each other at their opposite ends by means of rings 48,50. Each of the rings 48,50 is connected to a further webbing 52 at one end thereof, and each further webbing 52 is connected to further rings 54 at the opposite end thereof.

The harness 40 is suitable for use with the restraining device 10 and when the harness 40 has been fitted to the dog, as shown in FIG. 3, both of the further rings can both be received by the hook shaped member 26 of a single restraining device 10 at the back of the dog, when the ring 12 of the device 10 has been fitted to a safety belt 56 (See FIG. 3).

Thus, the dog is restrained in the vehicle by the attachment of the restraining device 10 to the seat belt.

Figure 5:
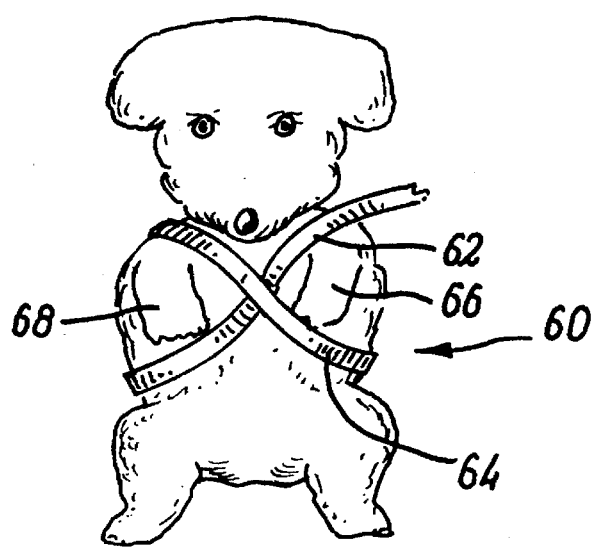
FIG. 5 is a view of a dog wearing a second harness.
Figure 6:
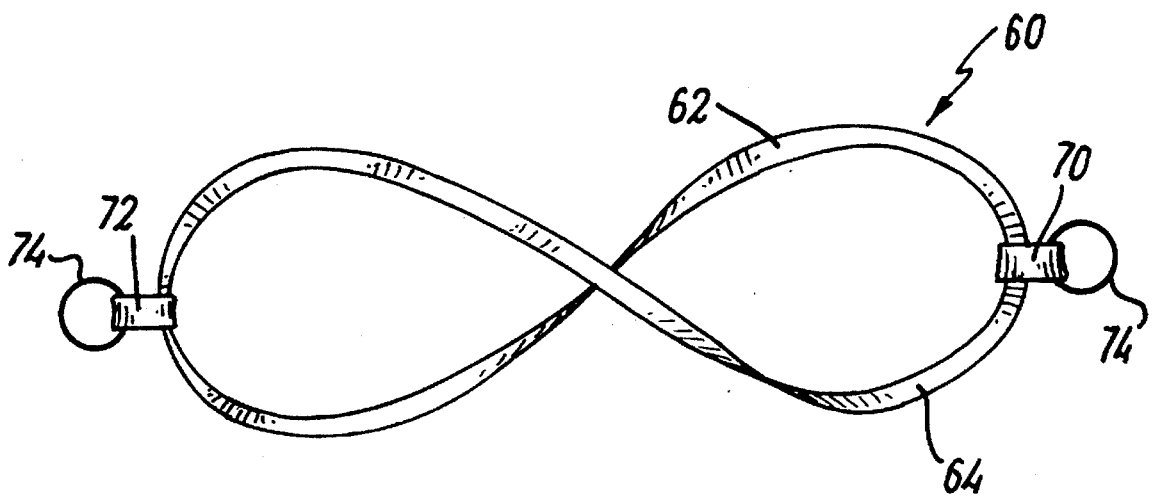
FIG. 6 is a view of the harness shown in FIG. 5.

FIGS. 5 and 6 show a further harness 60 and a dog to which the harness 60 has been fitted. The harness 60 comprises a first webbing 62 and a second webbing 64 as can be seen from FIG. 6, the harness 60 is in a figure eight configuration and the first webbing 62 extends in front of the front left leg 66 of a dog and to the rear of the front right leg 68 of a dog. The webbing 64 extends to the rear of the front left leg 66 of a dog and to the front of the front right leg 68 of a dog. The first and second webbings 62,64 are attached at their opposite ends to further webbings 70,72. The Further webbings 70,72 are each attached to a further ring 74 whereby the harness can be coupled to a restraining device 10 in a similar fashion to the harness shown in FIGS. 3 and 4.

It will be appreciated that the first and second webbings 42,44 and 62,64 in both of the above embodiments could be formed from a single webbing extending either in a loop or in a figure eight configuration. The opposite ends of the single webbing could simply be stitched together.

Further modifications can be made without departing from the scope of the invention. For example, the ring 12 could be made substantially continuous whereby in order to secure the device to the seat belt, an end of a seat belt would need to be passed through the ring 12.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A restraining device for an animal, said restraining device comprising:

a safety belt receiving means adapted to receive a safety belt in a vehicle, the safety belt receiving means being in the form of a split ring having first and second end portions, whereby the safety belt can be passed between said first and second end portions to be received in the space defined by the ring, the ring being substantially triangular in configuration, and wherein the first and second end portions overlap each other whereby both of said end portions extend substantially across the length of one side of the triangle, and said attaching means being arranged on the ring opposite said first and second end portions;

securing means to secure the device to an animal; and attaching means to attach the safety belt receiving means to the securing means.

2. A restraining device according to claim 1 wherein the first and second end portions are substantially linear.

3. A restraining device according to claim 1 wherein the attaching means comprises a sleeve mounted on the ring, the sleeve being adapted to hold the securing means thereon.

4. A restraining device according to claim 3 wherein the attaching means is adapted to secure the securing means to the safety belt receiving means such that the securing means cannot move along the safety belt receiving means.

5. A restraining device according to claim 3 wherein the sleeve is formed of an elastomeric material, and is adapted to hold a part of the securing means between the sleeve and the safety belt receiving means, the sleeve having a cut out portion to allow said part of the securing means to be received between the sleeve and the safety belt receiving means.

6. A restraining device according to claim 3 wherein the securing means is provided with a looped portion adapted to be received between said sleeve and said ring.

7. A restraining device according to claim 6 wherein the securing means is pivotally connected to said looped portion.

8. A restraining device according to claim 1 wherein the attaching means is in the form of an aperture in the safety belt receiving means through which a projection on the securing means can be passed to connect the securing means pivotally to the safety belt receiving means.

9. A restraining device according to claim 1 wherein the securing means is adapted to cooperate with a cooperating member attached to the animal, the securing means including a hook shaped member adapted to receive said cooperating member.

10. A restraining device according to claim 9 wherein the hook shaped member is provided with resiliently urged opening means movable between open and closed positions, the opening means being urged towards the closed position.

11. A restraining device for an animal, said restraining device comprising:

a safety belt receiving means adapted to receive a safety belt in a vehicle;

securing means to secure the device to an animal; and attaching means to attach the safety belt receiving means to the securing means, wherein the attaching means comprises a sleeve mounted on the safety belt receiving means, the sleeve being adapted to hold the securing means thereon.

12. A restraining device according to claim 11 wherein the attaching means is adapted to secure the securing means to the safety belt receiving means such that the securing means cannot move along the safety belt receiving means.

13. A restraining device according to claim 11 wherein the sleeve is formed of an elastomeric material, and is adapted to hold a part of the securing means between the sleeve and the safety belt receiving means, the sleeve having a cut out portion to allow said part of the securing means to be received between the sleeve and the safety belt receiving means.

14. A restraining device according to claim 11 wherein the securing means is provided with a looped portion adapted to be received between said sleeve and said safety belt receiving means.

15. A restraining device according to claim 14 wherein the securing means is pivotally connected to said looped portion.

16. A restraining device according to claim 11 wherein the safety belt receiving means is in the form of a ring adapted to receive said safety belt in a space defined thereby, the ring being substantially triangular in configuration, and said attaching means being provided at an apex of the triangle.

17. A restraining device according to claim 16 wherein the ring has suitable means for allowing the safety belt to be received in the space defined by the ring.

18. A restraining device according to claim 11 wherein the safety belt receiving means is in the form of a split ring having first and second end portions, whereby the safety belt can be passed between said first and second end portions to be received in the space defined by the ring.

19. A restraining device according to claim 11 wherein the safety belt receiving means is in the form of a substantially continuous ring, whereby the safety belt can be passed through the space defined by the ring so that the safety belt can be received therein.

20. A restraining device according to claim 19 wherein a portion of the ring opposite said attaching means is substantially linear.

21. A restraining device according to claim 11 wherein the safety belt receiving means is in the form of a ring provided with a hinged portion movable between closed and open positions, whereby when the hinged portion is in the open position, the safety belt can be received into the ring.

22. A restraining device according to claim 21 wherein the ring has a substantially linear portion arranged opposite the attaching means, the attaching means being provided on an apex adjacent said hinged portion.

23. A restraining device according to claim 11 wherein the securing means is adapted to cooperate with a cooperating member attached to the animal, the securing means including a hook shaped member adapted to receive said cooperating member.

24. A restraining device according to claim 23 wherein the hook shaped member is provided with resiliently urged opening means movable between open and closed positions, the opening means being urged towards the closed position.

* * * * *